In making this addition, it is assumed that all of the sodium acid pyrophosphate has been converted to tetrasodium pyrophosphate although satisfactory results are obtainable if it is assumed that only reactions (2) and/or (3) take place and enough water is added to completely or substantially completely yield the monohydrate or trisodium hydrogen pyrophosphate: $Na_3HP_2O_7.9H_2O$.

The further hydration of the partly hydrated tetrasodium pyrophosphate may also be carried out by adding aqueous solutions of salts such for example as sodium silicates. For this purpose the liquid commercial form of sodium silicates which contain from 46% to 63% of water, 9% to 18% $Na_2O$ and 29% to 36% $SiO_2$ may be used.

*Example 4*

15 parts of the oily condensation product of tall oil and ethylene oxide is added to 62 parts of finely divided anhydrous sodium tripolyphosphate, $Na_5P_3O_{10}$, and thoroughly mixed in a mechanical mixer. Liquid "N" brand silicate, 23 parts, is added and the mixing continued for approximately 10 minutes or more. The mixed product is removed from the mixer and is a cream colored powder, slightly granular and of good retentivity. This example illustrates the hydration of sodium tripolyphosphate by means of the water contained in the aqueous silicate.

While the use of aqueous sodium silicates is not ordinarily looked upon with favor by reason of the formation of sticky or gummy lumps in the product, we have found that when the addition of the aqueous silicate is made to the anhydrous or partly hydrated tetrasodium pyrophosphate in the presence of the ethylene oxide condensation product, the material quickly becomes dry and free flowing.

Alkali metal salts capable of further hydration in the present reaction are for example the following sodium salts, the list herewith showing the anhydrous salt, the intermediate hydrates, if any, and the fully hydrated form of the salt.

Sodium carbonate:
$Na_2CO_3$, $Na_2CO_3.H_2O$, $Na_2CO_3.7H_2O$, and
$Na_2CO_3.10H_2O$ Sodium sulfate:
$Na_2SO_4$, $Na_2SO_4.H_2O$ and $Na_2SO_4.7H_2O$ Sodium tripolyphosphate:
$Na_5P_3O_{10}$, $Na_5P_3O_{10}.6H_2O$.

Sodium sesquicarbonate:
$Na_3H(CO_3)_2$, $Na_3H(CO_3)_2.2H_2O$ or mixtures of normal and acid sodium carbonates variously known as modified sodas ranging in proportions of constituents from $2NaHCO_3:Na_2CO_3$ to $NaHCO_3$ to $2Na_2CO_3$.

Disodium orthophosphate:
$Na_2HPO_4$, $Na_2HPO_4.7H_2O$, $Na_2HPO_4.12H_2O$.

Trisodium orthophosphate:
$Na_3PO_4$, $Na_3PO_4.12H_2O$.

By the term "capable of further hydration" as used in the specification and claims, we mean either the anhydrous form of the salt or a lower hydrate of the salt which, on reaction with water, forms a higher hydrate or the completely hydrated form of the salt. Obviously the hydrate so produced should be stable at ordinary temperatures. At least one part by weight of a salt capable of further hydration should be hydrated in the presence of from 0.1 to 1 part of the oily condensation product, it being understood that the relative proportion of salt to condensation product will vary with the condensation product used.

Carboxy methyl cellulose is desirably added in amount of from 0.5% to 5.0% of the final product. The product produced according to the above procedure is adjusted to the following composition:

| | Per cent |
|---|---|
| Ethylene oxide condensation product | 20 |
| Tetrasodium pyrophosphate deca hydrate | 67 |
| Sodium silicate, $Na_2O:SiO_2$ ratio 1:3.2 | 9 |
| Carboxy methyl cellulose | 1.5 |
| Soda ash | 2.5 |

The condensation product of tall oil and ethylene oxide may be prepared by the method described in pending application Serial No. 637,096, filed December 22, 1945, now abandoned, which application is assigned to the same assignee as is the present case. According to this application, ethylene oxide in gas or liquid form is passed into tall oil at a temperature of from 130° C. to 190° C. until at least 0.5 part, but not less than 2.3 parts of ethylene oxide has become combined per part of tall oil. In order to assist the condensation reaction a small amount (0.1% to 0.2%) of KOH or NaOH is added to the tall oil.

In place of the condensation product of tall oil with ethylene oxide, we may employ similarly the condensation product obtained by reacting ethylene oxide with one or a mixture of the following materials:

Fatty acids having at least 8 carbon atoms in the molecule and either saturated or unsaturated.

Alicyclic acids such as abietic acid.

Fatty alcohols having at least 8 carbon atoms in the molecule, straight or branched chain, saturated or unsaturated.

Alicyclic alcohols such as abietyl alcohol.

Fatty amines, saturated or unsaturated having at least 8 carbon atoms.

Fatty amides derived from fatty acids having at least 8 carbon atoms.

Alkylated phenols having from 6 to 10 carbon atoms in the alkyl chain.

These compounds are characterized by having an active hydrogen atom which is reactive with ethylene oxide to give polyglycol ether type condensation products. The oily liquid to semi-liquid condensation product may contain from 5 moles to 20 or more moles of condensed ethylene oxide per mole of active hydrogen containing compound.

Compounds which are reactive with sodium acid pyrophosphate and which in the presence of water form trisodium hydrogen pyrophosphate and/or tetrasodium pyrophosphate are the alkali metal carbonates, bicarbonate or the sesquicarbonate. By reason of the availability of the common salts, I prefer to employ sodium carbonate, sodium bicarbonate or sodium sesquicarbonate. The amount employed should be at least sufficient to completely convert the sodium acid pyrophosphate to trisodium hydrogen pyrophosphate, and preferably to tetrasodium pyrophosphate. For most purposes we prefer to use an excess of the sodium carbonates, since any unreacted carbonate may advantageously remain in the final product.

Illustrative of the results obtained by the present process, we herewith give the results of the above mentioned "soaking test" as applied to various detergent formulations produced by the prior art methods and also by the method of the present invention.

The following formulations were prepared, in each case employing the condensation product of tall oil with 1.6 parts of ethylene oxide per part of tall oil.

| Formulation Number | 1 | 2 | 3 | 4 | 5 | 6 |
|---|---|---|---|---|---|---|
| Condensation product, percent | 20.0 | 20.0 | 12.5 | 15.0 | 17.5 | 20.0 |
| Tetrasodium pyrophosphate | 40.0 | 40.0 | 40.0 | 40.0 | 40.0 | 40.0 |
| Sodium sesquicarbonate | 20.0 | 20.0 | | | | |
| Starch | 18.5 | 18.5 | | | | |
| Carboxy methyl cellulose | 1.5 | 1.5 | 1.5 | 1.5 | 1.5 | 1.5 |
| Sodium silicate solution (62.4+ $H_2O$) | | | 24.0 | 24.0 | 24.0 | 24.0 |
| Sodium carbonate | | | 10.0 | 7.5 | 5.0 | 2.5 |
| Water added | | | 12.0 | 12.0 | 12.0 | 12.0 |

The method of formulation employed in preparing the above was as follows: 1 and 2 were prepared by mixing the dry ingredients, 1 being a laboratory preparation and 2 being from a plant batch of material. Numbers 3 and 6 inclusive, were prepared by the method of Example 3 of the present application. The tetrasodium pyrophosphate employed was prepared by the calcination of hydrated disodium orthophosphate.

Upon applying the "soaking test" described above, the results obtained were as folows:

| Formulation No. | Grams Cond. Prod. Absorbed By Filter Paper | Percent of Total Cond. Product Absorbed By Filter Paper |
|---|---|---|
| 1 | 0.671 | 1.08 |
| 2 | 0.933 | 2.33 |
| 3 | 0.013 | 0.05 |
| 4 | 0.007 | 0.02 |
| 5 | 0.013 | 0.04 |
| 6 | 0.019 | 0.05 |

From the above data, it will be noted that the retentivity of the oily condensation product has been very greatly increased by carrying out the hydration of the salts present in the presence of the condensation product.

What we claim is:

1. The process of increasing the retentivity of a finely divided inorganic hydratable alkali metal detergent builder for an oily detergent of the polyglycol ether type, which consists essentially in gradually adding an aqueous medium to said builder while mixing the latter in the finely divided solid state with said oily detergent in an amount varying from about 0.1 part to about 1 part of said oily detergent for each part of said builder, said aqueous medium supplying water only in an amount sufficient to form a hydrate of said hydratable alkali metal detergent builder and said water incorporated with said aqueous medium being retained in said mixture as the hydrate of said builder.

2. The process of increasing the retentivity of a finely divided inorganic hydratable alkali metal detergent builder for an oily detergent derived from the condensation of ethylene oxide with tall oil, which consists essentially in gradually adding an aqueous medium to said detergent builder while mixing the latter in the finely divided solid state with said oily detergent in an amount varying from 0.1 part to about 1.0 part of said oily detergent for each part of said builder, said aqueous medium supplying water only in an amount sufficient to form a hydrate of said hydratable alkali metal detergent builder and said water incorporated with said aqueous medium being retained in said mixture as the hydrate of said builder.

3. The process of increasing the retentivity of a finely divided inorganic hydratable alkali metal detergent builder for an oily detergent derived from the condensation of about 0.5 part to about 2.3 parts of ethylene oxide with about 1 part of tall oil, which consists essentially in gradually adding an aqueous medium to said detergent builder while mixing the latter in the finely divided solid state with said oily detergent in an amount varying from 0.1 part to 1 part of said oily detergent for each part of said builder, said aqueous medium supplying water only in an amount sufficient to form a hydrate of said hydratable alkali metal detergent builder and said water incorporated with said aqueous medium being retained in said mixture as the hydrate of said builder.

4. The process of increasing the retentivity of a finely divided inorganic hydratable alkali metal detergent builder for an oily detergent derived from the condensation of about 1.6 parts of ethylene oxide with about 1 part of tall oil, which consists essentially in gradually adding an aqueous medium to said detergent builder while mixing the latter in the finely divided solid state with said oily detergent in an amount varying from about 0.2 to about 0.5 part of said oily detergent for each part of said builder, said aqueous medium supplying water only in an amount sufficient to form a hydrate of said hydratable alkali metal detergent builder and said water incorporated with said aqueous medium being retained in said mixture as the hydrate of said builder.

5. The process defined in claim 4 wherein finely divided solid tetrasodium pyrophosphate is the hydratable alkali metal detergent builder employed.

6. The process defined in claim 4 wherein finely divided solid trisodium hydrogen pyrophosphate is the hydratable alkali metal detergent builder employed.

7. The process defined in claim 4 wherein finely divided solid sodium tripolyphosphate is the hydratable alkali metal detergent builder employed.

8. The process defined in claim 4 wherein the aqueous medium consists of water.

9. The process defined in claim 4 wherein the aqueous medium is a liquid sodium silicate containing 46% to 63% water, 9% to 18% $Na_2O$ and 29% to 36% $SiO_2$.

10. The process defined in claim 4 wherein the oily detergent is employed in an amount corresponding to about .3 part for each part of said builder.

11. The process of increasing the retentivity of finely divided anhydrous tetrasodium pyrophosphate for an oily detergent derived from the condensation of about 1.6 parts of ethylene oxide with about 1 part of tall oil, which consists essentially in gradually adding water to said salt while intimately mixing the latter in the finely divided solid state with said oily detergent in an amount corresponding to about 0.5 part of said oily detergent for each part of said tetrasodium pyrophosphate, said water being added only in an amount sufficient to form the decahydrate of said salt and said water being retained in said mixture as the decahydrate of said salt.

12. The process of increasing the retentivity of finely divided sodium tripolyphosphate for an oily detergent derived from the condensation of ethylene oxide with tall oil, which consists essentially in gradually adding an aqueous medium to said salt while intimately mixing the latter in the finely divided solid state with said oily detergent in an amount corresponding to about 0.2 part of said oily detergent for each part of said sodium tripolyphosphate, said aqueous medium consisting of a liquid sodium silicate containing 46% to 63% water, 9% to 18% $Na_2O$ and 29% to 36% $SiO_2$ and being employed only in an amount sufficient to form a hydrate of said sodium tripolyphosphate and said water incorporated with said aqueous medium being retained in said mixture as the hydrate of said sodium tripolyphosphate.

References Cited in the file of this patent

UNITED STATES PATENTS

| | | |
|---|---|---|
| 2,154,977 | Furness | Apr. 18, 1939 |
| 2,351,559 | Treffler | June 13, 1944 |
| 2,365,215 | Rhodes | Dec. 19, 1944 |
| 2,427,642 | Aitchison | Sept. 16, 1947 |

FOREIGN PATENTS

| | | |
|---|---|---|
| 469,334 | Great Britain | July 23, 1937 |
| 490,285 | Great Britain | Aug. 11, 1938 |